S. STERNAU, L. STRASSBURGER & A. N. LATTIN.
TEA OR COFFEE POT.
APPLICATION FILED JUNE 10, 1905.
1,061,336.
Patented May 13, 1913.
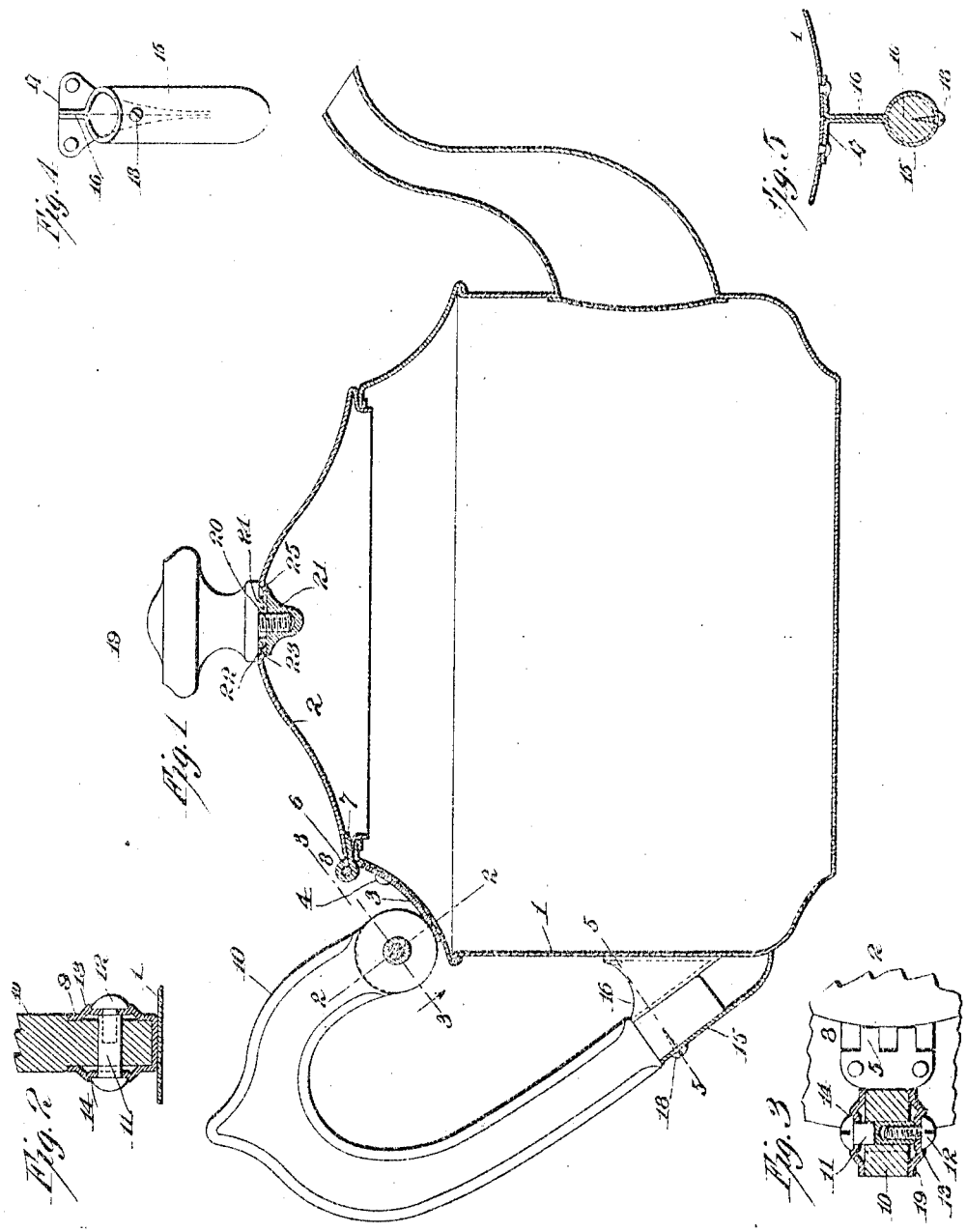

UNITED STATES PATENT OFFICE.

SIGMUND STERNAU, LIONEL STRASSBURGER, AND ALBERT N. LATTIN, OF NEW YORK, N. Y., ASSIGNORS TO S. STERNAU & COMPANY, OF NEW YORK, N. Y., A COPARTNERSHIP.

TEA OR COFFEE POT.

1,061,336.  Specification of Letters Patent.  Patented May 13, 1913.

Application filed June 10, 1905. Serial No. 264,630.

*To all whom it may concern:*

Be it known that we, SIGMUND STERNAU and LIONEL STRASSBURGER, residing in the borough of Manhattan, county of New York, city and State of New York, and ALBERT N. LATTIN, residing in the borough of Brooklyn, county of Kings, city and State of New York, citizens of the United States, have invented certain new and useful Improvements in Tea or Coffee Pots, of which the following is a description.

The object we have in view is the production of a tea or coffee pot, or other culinary vessel, which will have certain advantages in the details of construction. These advantages reside in the knob or handle for the cover, the hinge for the cover, the handle for the pot, and the means for attaching the same thereto, such details producing a very attractive and useful article, which will be formed of a minimum of parts, which will not readily get out of order, and which may be constructed very cheaply. We attain these objects by the mechanism illustrated in the accompanying drawings, in which—

Figure 1 is a sectional view through a tea pot embodying our invention, the handle or knob being shown partly in elevation. Fig. 2 is a sectional view taken on the lines 2—2 of Fig. 1. Fig. 3 is a sectional view, taken on the lines 3—3 of Fig. 1 and looking in the direction of the arrow. Fig. 4 is a rear elevation of the support for the lower end of the handle, and Fig. 5 is a sectional view taken on the lines 5—5 of Fig. 1.

In all the views like parts are designated by the same reference character.

In carrying out our invention we provide a body 1 of the usual type, but preferably made of metal, and of any size or shape desired. This body may be in the form of a tea pot, coffee pot, or other culinary vessel. In connection with the body 1 is used a cover 2, the two being hinged together. The structure of the hinge is shown in Figs. 1, 2 and 3. It is formed of two parts, preferably of sheet metal, one part 3 being riveted or otherwise secured to the body 1 by means of rivets 4. One end of the part 3 is bifurcated forming projections 5—5, and is so bent over as to inclose a pin 6. Upon the cover 2 is soldered or otherwise secured a plate 7, having two cutaway portions so as to produce three projections 8—8—8, which are curved over and made to surround the pin 6. This pin 6, together with the projections 5 and 8, constitutes a hinge and permits the cover to be raised or lowered, as will be evident. On the other extremity of the plate 3 are formed ears 9—9. These ears are upset at right angles to the plate 3 and embrace on each side one extremity of the handle 10. The handle may be made of any good insulating material, such as wood, ivory or celluloid, as desired. The upper extremity of the handle is secured between the ears 9 by means of a pin or rivet 11. The rivet is provided with an enlarged head, as shown, and its other end abuts against the inside of the opposed ear 9. This ear is perforated and through such perforation passes the screw 12, which enters a threaded opening formed in the pin 11, as shown in Fig. 3. By combining the hinge and ears upon a single plate, a great saving in expense is secured; furthermore, a much neater fitting is made, and the weight of the completed structure is less.

The ears 9—9 are upset or dished at 13 and the center of the dished portion is inset at 14 forming a seat for the head of the pin 11 and the head of the screw 12. By dishing the ears 9 an elastic seat is formed for the pin which serves the purpose of a lock nut and prevents the parts from becoming loose or separated. The inset portion 14 serves as a finish for the round heads of the pin and screw and hides their sharp edges. The head of the pin and screw may be nicked as shown in Fig. 3 for the attachment of a screw driver.

The lower extremity of the handle 10 is rounded and shouldered and enters a fitting. This fitting is preferably formed of a single piece of sheet metal having a cylindrical portion 15 for entrance of the reduced portion of the handle, and having a double webbed portion 16 extending inward. The said webbed portions have flanges 17. These flanges may be riveted or otherwise secured to the body 1 of the utensil. A screw 18 which passes through an opening in the cylindrical portion of the socket enters the material of the handle and forms a removable securing means therefor.

The knob 19 is preferably formed of wood or other heat insulating material and has secured to it permanently a metal screw or stud 20. This screw enters a threaded opening in the fixed nut or monitor piece 21.

The monitor piece is preferably of ductile metal and has an annular extension 22 of less diameter than its upper surface, thus forming an inset flange 23. The upper end of the cover 2 adjacent to the opening 24 is inset at 25. The opening 24 is of such a size as to make a close fit with the annular portion 22 of the monitor piece. The latter is sufficiently long so that after being passed through the opening 24 it may be turned down or riveted, as shown, thus securely fastening the monitor piece in position. The turned over portion will be of no greater height than the depth of the inset 25, so that when the knob 19 is in place and in engagement with the turned over portion of the annular portion 22 it will also engage with the edge of the inset portion of the cover and there will be no opening formed between the two. The turned in portion may be of less height than the depth of the inset, and when thus made the knob will bear against the edge of the inset and not against both inset and flange. By this construction the monitor piece is permanently attached within the opening at the top of the cover so that when used in connection with a wooden handle having a fixed threaded stud, a stable and successful means of securing the parts is obtained. The objection to having a permanent wood screw which extends up into a wooden knob and which soon becomes loose, or a machine screw upon a knob engaging with a loose monitor piece, is thereby avoided.

The means for securing the knob to the cover, as described in the specification, is not claimed herein, but will form the subject matter of an application for patent to be filed subsequently.

Having described our invention what we claim as new and desire to secure by Letters Patent is—

1. In a tea or coffee pot, the combination of the body and cover and handles; and a combined handle support and hinge comprising a plate attached to the cover and forming one leaf of the hinge, another plate attached to the body and forming at one end the other leaf of the hinge and having ears between which the handle fits, and a bolt passing through said ears and said handle.

2. In a tea or coffee pot, the combination with a plate having ears, inset portions having central openings therein, a handle between the ears, a bolt passing through one ear and the handle and terminating short of the other ear, the said bolt having a threaded seat in the end opposite the head and a screw passing through the other ear and entering the threaded seat.

This specification signed and witnessed this 6th day of June, 1905.

SIGMUND STERNAU.
LIONEL STRASSBURGER.
ALBERT N. LATTIN.

Witnesses:
JAMES H. MALLORY,
ROBT. E. TAYLOR.